United States Patent
Hawthorne

(10) Patent No.: US 8,145,768 B1
(45) Date of Patent: Mar. 27, 2012

(54) TUNING OF SSL SESSION CACHES BASED ON SSL SESSION IDS

(75) Inventor: Jonathan Mini Hawthorne, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 215 days.

(21) Appl. No.: 12/037,824

(22) Filed: Feb. 26, 2008

(51) Int. Cl.
- G06F 15/16 (2006.01)
- G06F 15/173 (2006.01)
- G06F 7/04 (2006.01)
- H04L 29/06 (2006.01)

(52) U.S. Cl. ........ 709/228; 709/205; 709/217; 709/223; 709/227; 709/238; 726/5; 713/150

(58) Field of Classification Search .................. 709/205, 709/217, 223, 227, 238, 228; 726/5
See application file for complete search history.

(56) References Cited

U.S. PATENT DOCUMENTS

| | | | |
|---|---|---|---|
| 7,062,570 B2 * | 6/2006 | Hong et al. ................... | 709/238 |
| 7,102,996 B1 | 9/2006 | Amdahl et al. | |
| 7,177,945 B2 * | 2/2007 | Hong et al. ................... | 709/238 |
| 7,228,350 B2 * | 6/2007 | Hong et al. ................... | 709/226 |
| 7,280,540 B2 * | 10/2007 | Halme et al. .................. | 370/392 |
| 7,360,075 B2 * | 4/2008 | VanHeyningen et al. ..... | 713/151 |
| 7,383,329 B2 * | 6/2008 | Erickson ....................... | 709/223 |
| 2007/0244987 A1 * | 10/2007 | Pedersen et al. .............. | 709/217 |
| 2007/0245409 A1 * | 10/2007 | Harris et al. ...................... | 726/5 |
| 2007/0282951 A1 * | 12/2007 | Selimis et al. ................ | 709/205 |
| 2008/0104390 A1 * | 5/2008 | VanHeyningen et al. ..... | 713/151 |
| 2008/0104686 A1 * | 5/2008 | Erickson ............................ | 726/7 |

OTHER PUBLICATIONS http://en.wikipedia.org/w/index.php?title=Exclusive_or &oldid=375944361, Exclusive or, Wikipedia, The Free Encyclopedia, last modified Jul. 28, 2010, 8 pages.

* cited by examiner

*Primary Examiner* — David Lazaro
*Assistant Examiner* — Vitali Korobov
(74) *Attorney, Agent, or Firm* — Frommer Lawrence & Haug LLP; Jamie L. Wiegand

(57) ABSTRACT

Methods, systems, and apparatus are directed towards managing a network communication. A Secured Socket Layer (SSL) session identifier (ID) is received within an SSL handshake protocol message for establishing an SSL connection. The SSL session ID is combined with a pre-determined ID associated with a network device to generate another ID. The other ID may comprise a plurality of information associated with an operation for caching the SSL session ID and/or for caching other information usable in re-establishing an SSL session over the SSL connection. The plurality of information may comprise an expiration time, a cache line, a cache ID, and a unique ID. Based on at least a portion of the other ID, a failure statistic associated with re-establishing the SSL session for the SSL connection is determined. A session cache and/or the operation for caching are tuned based on the failure statistic.

17 Claims, 6 Drawing Sheets

TUNING OF SSL SESSION CACHES BASED ON SSL SESSION IDS

TECHNICAL FIELD

The present invention relates generally to network communications, and more particularly, but not exclusively, to causing a network device to tune an SSL session cache based on an SSL session ID.

BACKGROUND

Secure Sockets Layer (SSL)/Transport Layer Security (TLS) has become a popular protocol for secure communication over the Internet. A version of the SSL protocol is described in *Netscape Communications Corp., Secure Sockets Layer (SSL) version* 3, (November 1996). The TLS protocol is derived from SSL, and is described in Dierks, T., and Allen, C., "The TLS Protocol Version 1.0," RFC 2246 (January 1999), available through the Internet Engineering Task Force (IETF), and is incorporated herein by reference.

An SSL/TLS session may be initiated using a SSL/TLS handshake or re-handshake protocol. A CLIENT-HELLO message may be sent from a client to a server. The CLIENT-HELLO message may include an SSL session identifier (ID), among other things. If the SSL session ID is an ID that is unknown by the server, is unassociated with a valid session, or is otherwise invalid, the server may respond with a SERVER-HELLO message which includes a different SSL session ID. The client and server may continue with the SSL/TLS handshake protocol to negotiate an encryption algorithm to be used, to exchange certificates, or the like, as described in RFC 2246. For example, the client and server may send messages, including SERVER-CERTIFICATE, SERVER-HELLO-DONE, CLIENT-KEY-EXCHANGE, CHANGE-CIPHER-SPEC, FINISHED, or the like.

If on the other hand, the SSL session ID included with the CLIENT-HELLO message is an ID that is known by the server and associated with a valid session, the client and server may then use a shortened SSL/TLS handshake protocol and may reuse cryptographic information to re-establish the SSL session. The server may respond with a SERVER-HELLO message which includes the SSL session ID. The client and server may then exchange the CHANGE-CIPHER-SPEC messages and FINISHED messages. The SSL session is then re-established.

While the re-use of the SSL session ID is useful in re-establishing the SSL session, the use of the SSL session ID may involve inefficient use of memory or other computing resources. Also, the problems associated with the use of the SSL session ID may not be easily identifiable to network administrators.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the invention, which is to be read in association with the accompanying drawings, wherein.

DETAILED DESCRIPTION

Figure 1:
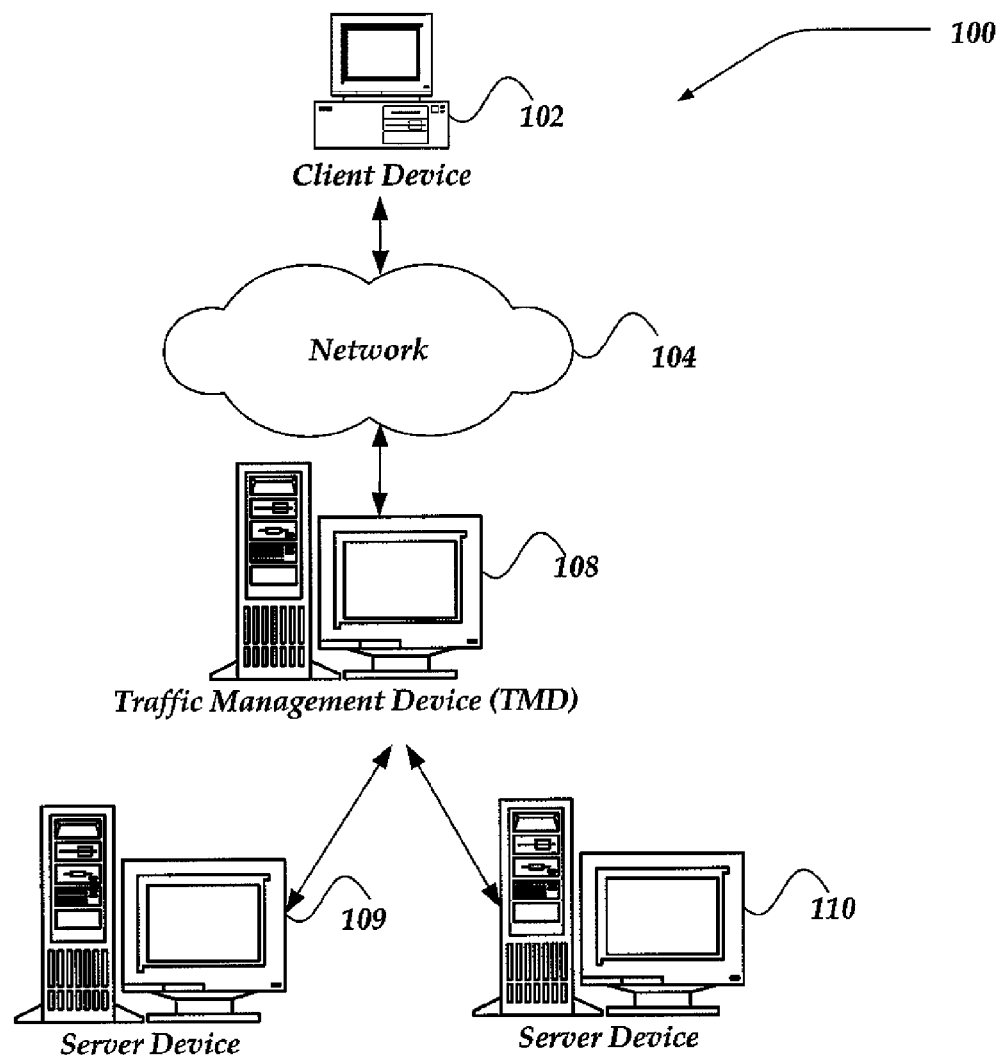
FIG. 1 shows a block diagram illustrating an environment for practicing the invention.

The invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meanings of "a," "an," and "the" include plural references. The meaning of "in" includes "in" and "on."

The term "network connection" refers to a collection of links and/or software elements that enable a computing device to communicate with another computing device over a network. One such network connection may be a TCP/IP connection. TCP/IP connections are virtual connections between two network nodes, and are typically established through a TCP/IP handshake protocol. The TCP/IP protocol is described in more detail in Request for Comments (RFC) 793, and/or RFC 1323, which are available through the IETF, and are each herein incorporated by reference.

As used throughout this application, including the claims, SSL refers to SSL, TLS, and all secure communications protocols derived therefrom. As used herein, the term SSL connection is directed towards secure virtual connections between network nodes that may be established using an SSL/TLS handshake protocol. An SSL connection may have an SSL session ID associated with it that is used to identify an SSL session associated with the connection. An SSL connection can be terminated, and a new SSL connection established using the same SSL session ID as the terminated connection. When this occurs, an SSL session that began with the first SSL connection is re-established or re-used with a second SSL connection. Therefore, an SSL session can have one or more SSL connections associated with it. Moreover, an application running over an SSL connection may use the SSL session ID to identify and manage the session.

Embodiments are directed towards managing a network communication. In a Secure Socket Layer (SSL) handshake protocol, a first SSL session identifier (ID) is generated. The first SSL session ID may be based on a combination of a generated ID and a pre-determined ID associated with a network device. The generated ID may comprise an expiration time associated with the SSL session, a cache line index into a cache lookup table, a cache ID identifying the cache lookup table, and a unique ID, or the like. A client device stores the SSL session ID for use in re-establishing an associated SSL session.

In a second SSL handshake protocol, a second SSL session ID is received within an SSL handshake protocol message for re-establishing the SSL session. The second SSL session ID is combined with the pre-determined ID to generate another ID. In one embodiment, the other ID should be the same as the generated ID used in the first SSL handshake protocol, if it is the same client device and not otherwise forged, invalid, or the like. The other ID may comprise a plurality of information associated with an operation for caching the SSL session ID and/or for caching other information usable in re-establishing an SSL session over the SSL connection. The plurality of information may comprise the expiration time, the cache line, the cache ID, and the unique ID. Based on at least a portion of the other ID, a failure statistic associated with re-establishing the SSL session for the SSL connection is determined. A session cache and/or the operation for caching are tuned based on the failure statistic. For example, a cache size may be increased, a time-to-live may be increased, a number of cache lookup tables may be increased, or the like.

Illustrative Operating Environment

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client device 102, Traffic Management Device (TMD) 108, server devices 109-110, and network 104. TMD 108 is in communication with server devices 109-110, and with client device 102 through network 104. Although not illustrated, a network similar to network 104 may reside between TMD 108 and server devices 109-110.

Generally, client device 102 may include virtually any computing device capable of connecting to another computing device and receiving information. Such devices may also include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Client device 102 may also include other computing devices, such as personal computers, multiprocessor systems, microprocessor-based or programmable consumer electronics, network devices, and the like. As such, client device 102 may range widely in terms of capabilities and features. For example, a client device configured as a cell phone may have a numeric keypad and a few lines of monochrome LCD display on which only text may be displayed.

Client device 102 also may include at least one client application that is configured to receive content from another computing device. The client application may include a capability to provide and receive textual content, graphical content, audio content, alerts, messages, and the like. Moreover, client device 102 may be further configured to communicate a message, such as through a Short Message Service (SMS), Multimedia Message Service (MMS), instant messaging (IM), internet relay chat (IRC), mIRC, Jabber, and the like, between another computing device, and the like.

In another example, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and send a message.

In one embodiment, client device 102 may be configured such that an end-user may operate the computing device to make requests for data and/or services from other computers on the network. Client device 102 may establish an SSL session and SSL connection with one of server devices 109-110 and/or TMD 108. Client device 102 may receive an SSL session ID within at least one SSL handshake protocol message.

Client device 102 may re-establish a previously created SSL session with one of server devices 109-110 and/or TMD 108 by sending the SSL session ID within an SSL handshake protocol message to server devices 109-110 and/or TMD 108. In one embodiment, client device 102 may send the SSL session ID within a CLIENT-HELLO message.

Network 104 is configured to couple one computing device with another computing device. Network 104 may be enabled to employ any form of computer readable media for communicating information from one electronic device to another. Also, network 104 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 104 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Network 104 may also include an autonomous system of terminals, gateways, routers, and the like connected by wireless radio links, and the like. These connectors may be configured to move freely and randomly and organize themselves arbitrarily, such that the topology of network 104 may change rapidly.

Network 104 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, and future access networks may enable wide area coverage for mobile devices with various degrees of mobility. For example, network 104 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. In essence, network 104 may include virtually any wired and/or wireless communication mechanisms by which information may travel between one computing device and another computing device, network, and the like.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" include a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of TMD 108 is described in more detail below in conjunction with FIG. 2. Briefly, in one embodiment, TMD 108 may include virtually any device that manages network traffic. Such devices include, for example, routers, proxies, firewalls, load balancers, cache devices, devices that perform network address translation, any combination of the preceding devices, and the like. TMD 108 may, for example, control the flow of data packets delivered to and forwarded from an array of servers, such as server devices 109-110. TMD 108 may direct a request to a particular server based on network traffic, network topology, capacity of a server, content requested, and a host of other traffic distribution mechanisms. TMD 108 may receive data packets from and transmit data packets to the Internet, an intranet, or a local area network accessible through another network. TMD 108 may recognize packets that are part of the same communication, flow, and/or stream and may perform special processing on such packets, such as directing them to the same server so that state information is maintained. TMD 108 also may support a wide variety of network applications such as web browsing, email, telephony, streaming multimedia and other traffic that is sent in packets. The BIG-IP® family of traffic managers, by F5 Networks Inc. of Seattle, Wash., is one example of TMDs. Moreover, TMDs are described in more detail in U.S. Pat. No. 7,102,996 to Amdahl, et al. entitled "Method and System for Scaling Network Traffic Managers," which is incorporated herein by reference.

In one embodiment, TMD 108 may receive over network 104 an SSL handshake protocol message for initiating or restarting an SSL connection. TMD 108 may receive the message from client device 102 over network 104. TMD 108 may act as an SSL terminator/accelerator. TMD 108 may establish an SSL connection and SSL session with client device 102 on behalf of one of server devices 109-110. TMD 108 may decrypt data received from client device 102 and forward the data to server devices 109-110. TMD 108 may encrypt data from server devices 109-110 and forward the encrypted data over the SSL connection to client device 102.

In one embodiment, TMD 108 may generate an SSL session ID associated with the SSL session. TMD 108 may use process 500 of FIG. 5 to generate the SSL session ID. TMD 108 may send the SSL session ID within an SSL handshake protocol message to client device 102. TMD 108 may send the SSL session ID within a SERVER-HELLO message.

In one embodiment, TMD 108 may receive the SSL session ID within an SSL handshake protocol message from client device 102. The message may be a CLIENT-HELLO message. TMD 108 may confirm that the received SSL session ID is a valid SSL session ID and/or is associated with the previously created SSL session. TMD 108 may also enable tuning a session cache for storing the SSL session information and/or for confirming the validity of the SSL session ID. In one embodiment, TMD 108 may generate a failure statistic about failed attempts by client device 102 to re-establish the SSL session. The failure statistic may be provided through a user interface, such as a web interface, or the like, over network 104. The failure statistic may be provided to an administrator for tuning the session cache. The user interface may also be used to modify a parameter of the session cache based on the failure statistic. The tuning may improve the performance of the session cache for subsequent SSL sessions/SSL handshake protocols. TMD 108 may use processes 300-500 of FIGS. 3-5 to perform the generation of the failure statistic and/or tuning of the session cache.

In another embodiment, TMD 108 may not perform SSL processing. Instead, TMD 108 may forward the SSL messages to server devices 109-110 for SSL processing.

Server devices 109-110 may include any computing device enabled to provide data over a network. One embodiment of server devices 109-110 is described in more detail below in conjunction with FIG. 2. Briefly, in one embodiment, server devices 109-110 may initiate an SSL session with client device 102, cache an SSL session ID, re-establish an SSL session with client device 102, generate a failure statistic, and tune a session cache based on the failure statistic. Server devices 109-110 may perform the SSL handshake processing substantially similar to TMD 108, as described above. Server devices 109-110 may provide an interface for tuning the session cache over network 104. Server devices 109-110 may use processes 300-500 of FIGS. 3-5 to perform the generation of the failure statistic and/or tuning of the session cache.

Devices that may operate as TMD 108, and/or server devices 109-110 include, but are not limited to, personal computers, desktop computers, multiprocessor systems, microprocessor-based or programmable consumer electronics, network PCs, servers, or the like. While TMD 108 and server devices 109-110 are shown as separate devices, the devices may be combined in one device without departing from the scope of the invention. In one embodiment, TMD 108 may act as the SSL server, the SSL server may be a virtual machine, server software or the like. At least one service running on TMD 108 may perform processes 300-500 of FIGS. 3-5 and may forward SSL data between the SSL server running and TMD 108 and client device 102.

Moreover, in one embodiment, client device 102 and/or server devices 109-110 may also perform at least some operations of TMD 108, such as load balancing, or even the SSL processing as described herein.

Illustrative Network Device

Figure 2:
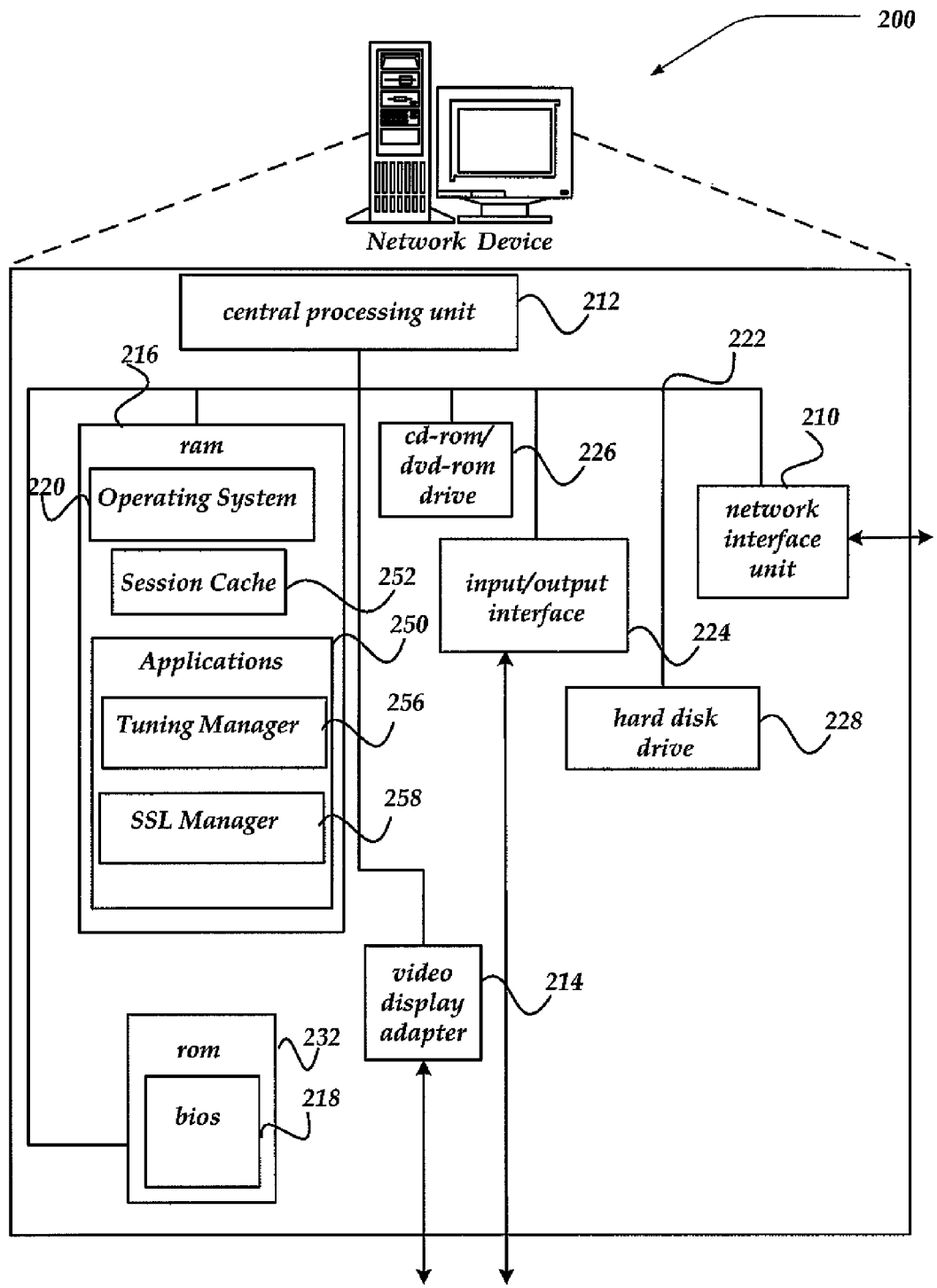
FIG. 2 illustrates one embodiment of a network device for practicing the invention.

FIG. 2 shows one embodiment of a network device, according to one embodiment of the invention. Network device 200 may include many more or less components than those shown. The components shown, however, are sufficient to disclose an illustrative embodiment for practicing one or more embodiments of the invention. Network device 200 may represent, for example, TMD 108 or server devices 109-110 of FIG. 1.

Network device 200 includes at least one central processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200.

As illustrated in FIG. 2, network device 200 also can communicate with the Internet, or some other communications network via network interface unit 210, which is constructed for use with various communication protocols including the TCP/IP protocol. Network interface unit 210 is sometimes known as a transceiver, transceiving device, or network interface card (NIC).

The mass memory 216, 226, 228, and 232 described herein and shown in FIG. 2 illustrate another type of computer-readable media, namely computer readable or processor readable storage media. Computer readable storage/machine-readable storage media may include volatile, nonvolatile, removable, and non-removable media implemented in any method or technology for storage of information, such as computer readable/machine-executable instructions, data structures, program modules, or other data, which may be obtained and/or executed by at least one processing unit 212 to perform one or more portions of process 300 of FIG. 3, for example. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, including data and/or computer/machine-executable instructions, and which can be accessed by a computing device.

The mass memory may also store other types of program code and data as applications 250, which may be loaded into mass memory and run on operating system 220. Examples of application 250 may include email client/server programs, routing programs, schedulers, web servers, calendars, database programs, word processing programs, HyperText Transfer Protocol (HTTP) programs, Real-Time Streaming Protocol (RTSP) programs, security programs, and any other type of application program.

Network device 200 may also include a Simple Mail Transfer Protocol (SMTP) handler application for transmitting and receiving e-mail, an HTTP handler application for receiving and handing HTTP requests, an RTSP handler application for receiving and handing RTSP requests, and an HTTPS handler application for handling secure connections. The HTTPS handler application may initiate communication with an external application in a secure fashion. Moreover, network device 200 may further include applications that support virtually any secure connection, including TLS, TTLS, EAP, SSL, IPSec, and the like.

Network device 200 may also include input/output interface 224 for communicating with external devices, such as a mouse, keyboard, scanner, or other input/output devices not shown in FIG. 2. Likewise, network device 200 may further include additional mass storage facilities such as cd-rom/dvd-rom drive 226 and hard disk drive 228. Hard disk drive 228 may be utilized to store, among other things, application programs, databases, and the like in the same manner as the other mass memory components described above.

In one embodiment, the network device 200 may include at least one Application Specific Integrated Circuit (ASIC) chip (not shown) coupled to bus 222. The ASIC chip can include logic that performs some or all of the actions of network device 200. For example, in one embodiment, the ASIC chip can perform a number of packet processing functions for incoming and/or outgoing packets.

In one embodiment, network device 200 can further include one or more field-programmable gate arrays (FPGA) (not shown), instead of, or in addition to, the ASIC chip. A number of functions of network device 200 can be performed by the ASIC chip, the FPGA, by CPU 212 with instructions stored in memory, or by any combination of the ASIC chip, FPGA, and a CPU.

In one embodiment, ram 216 may include session cache 252; however, session cache 252 may also reside completely, or in part, in another mass memory storage media, including, but not limited to a storage medium readable by cd-rom/dvd-rom drive 226, on hard disk drive 228, or even on a computer readable storage medium on another network device and possibly accessible by network device 200 through network interface unit 210.

Session cache 252 may include virtually any mechanism configured and arranged to store data and/or computer readable instructions, such as one or more a hash tables, lookup tables, hardware accelerated indices, or the like. Session cache 252 may index data by a cache line, an SSL session ID, or other identifier. Session cache 252 may use a data structure substantially similar to data structure 600 of FIG. 6. In one embodiment, session cache 252 may comprise a plurality of cache lookup tables. Each cache lookup table may comprise a plurality of entries identified by a unique cache line. Each entry may comprise SSL session information, including an SSL session ID.

Tuning manager 256 may include any component configured to manage session cache 252. The number of cache lookup tables, the size of at least one of the cache lookup tables, and any other parameters of session cache 252 may be set or otherwise modified by, for example, tuning manager 256. In one embodiment, tuning manager 256 may receive at least one failure statistic from SSL manager 258. The failure statistic may comprise an indication of why an attempt to re-establish an SSL session failed, a histogram related to the failure, a suggested action to take to improve performance based on the failure statistic, or the like. In one embodiment, tuning manager 256 may provide a user interface (e.g., web interface), over network interface unit 210. The user interface may enable an administrator/user to view the failure statistic and/or modify the parameters of session cache 252 based on the failure statistic. In another embodiment, tuning manager 256 may employ the failure statistic to automatically tune various parameters associated with session cache 256, including, but not limited to expiration times assigned to the cache, size of cache being allocated for a session, or the like. In one embodiment, tuning manager 256 may manage a plurality of parameters usable in managing and tuning session cache 252. In one embodiment, tuning manager 256 may initialize a pre-determined ID for network device 200. The initialization may occur when network device 200 is initialized. Tuning manager 256 may also increment a unique ID associated with an entry in a cache lookup table in session cache 252.

SSL manager 258 includes any component configured to manage the SSL handshake protocol and other SSL processing. SSL manager 258 may receive an SSL handshake message from a client device over network interface unit 210. SSL manager 258 may process the SSL handshake, communicate cryptographic information, or the like. After the SSL handshake protocol is complete, SSL manager 258 may encrypt and/or decrypt data communicated over an SSL connection for an SSL session over network interface unit 210. While SSL manager 258 is illustrated as a distinct component, in one embodiment, SSL manager 258 may also be integrated within another component or even as a component within operating system 220, or the like.

In one embodiment, SSL manager 258 may receive an SSL session ID within the SSL handshake protocol, if a client device attempts to re-establish a previously created SSL session. SSL manager 258 may confirm the validity of the SSL session ID, generate a failure statistic based on the received SSL session ID, or the like. SSL manager 258 may send the failure statistic to tuning manager 256 to enable an administrator to tune session cache 252.

Figure 3:
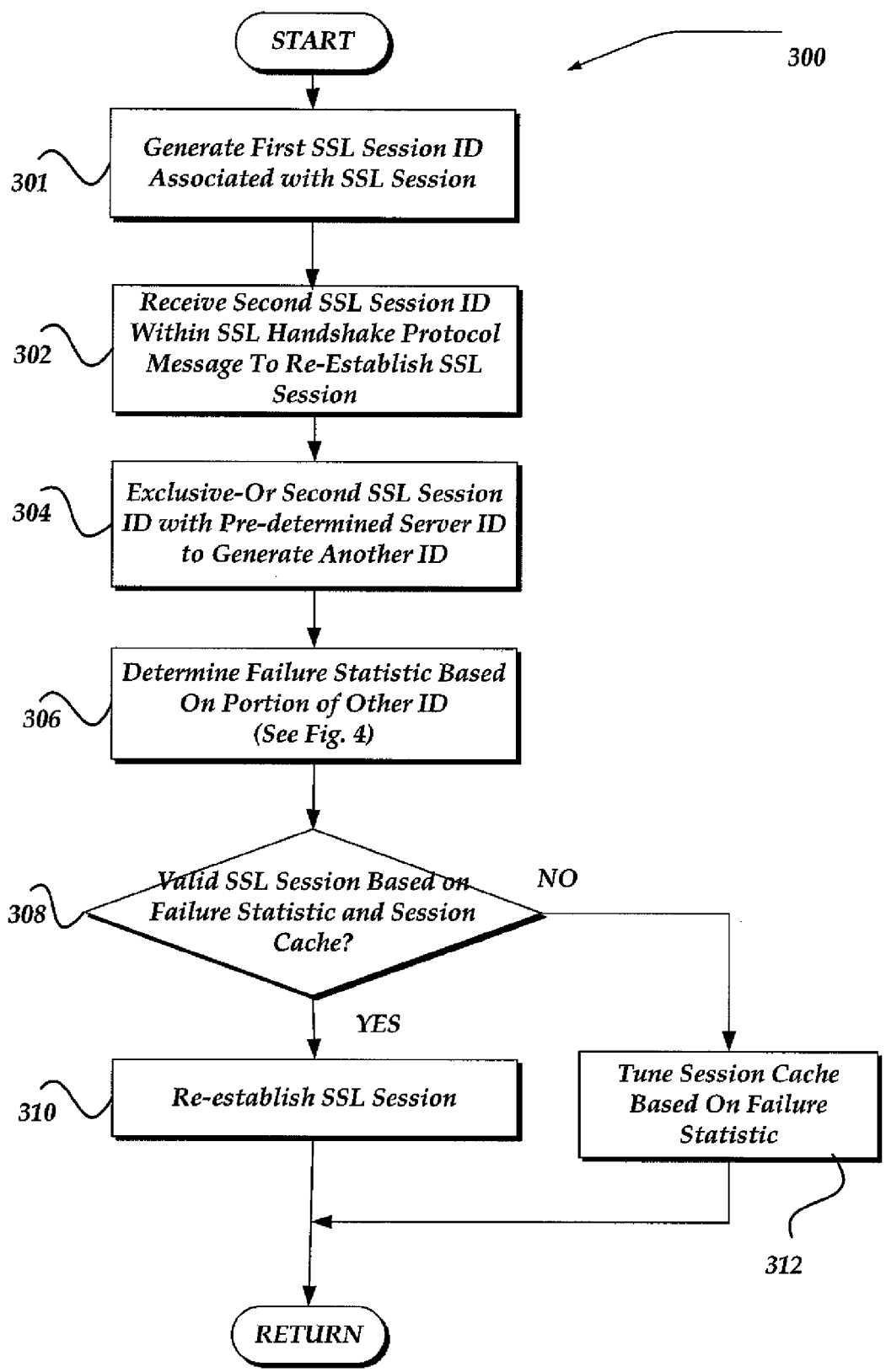
FIG. 3 illustrates a logical flow diagram generally showing one embodiment of a process for tuning a session cache for re-establishing an SSL session.
Figure 4:
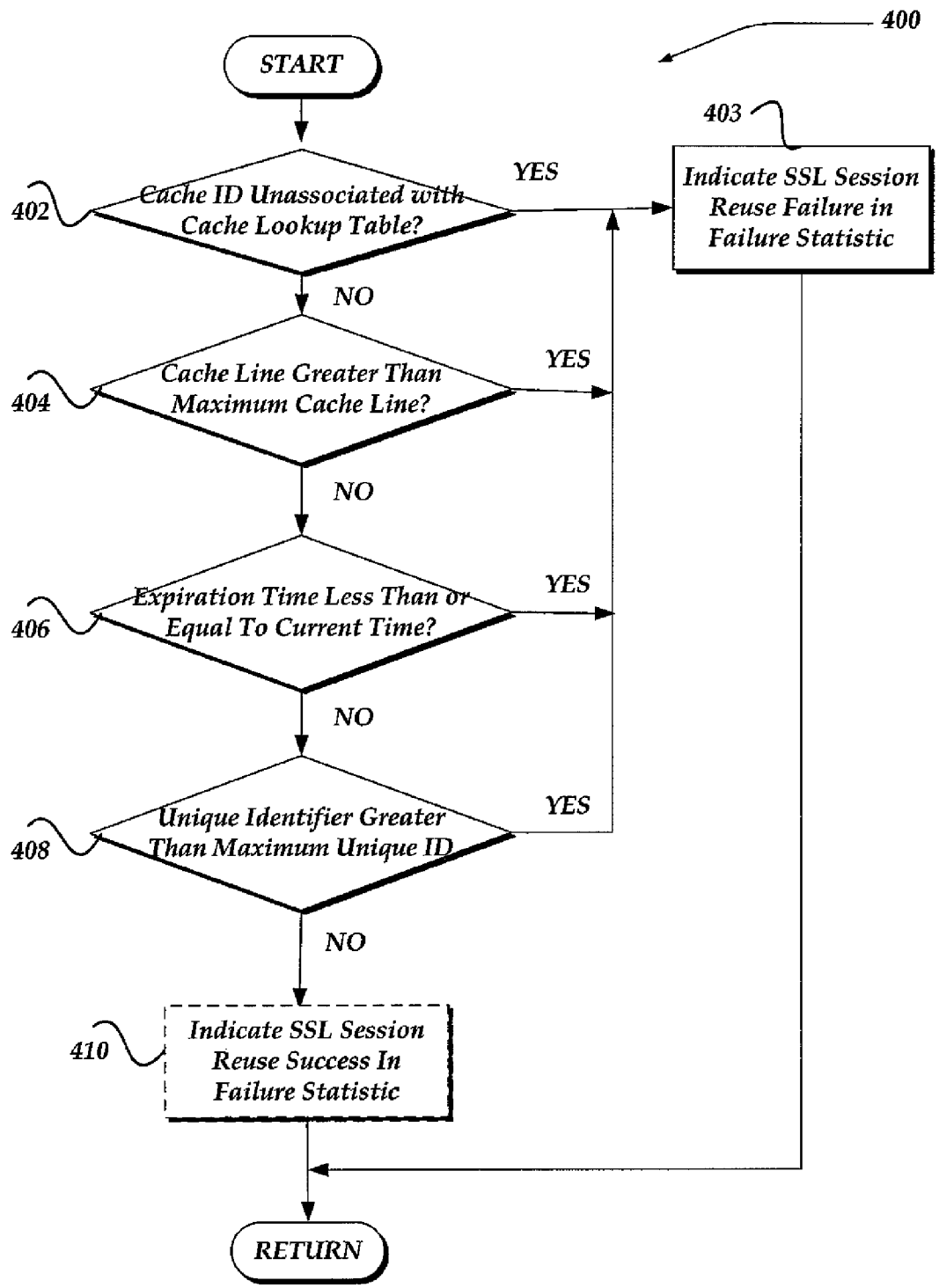
FIG. 4 illustrates a logical flow diagram generally showing one embodiment of a process for providing failure statistics associated with re-establishing an SSL session.
Figure 5:
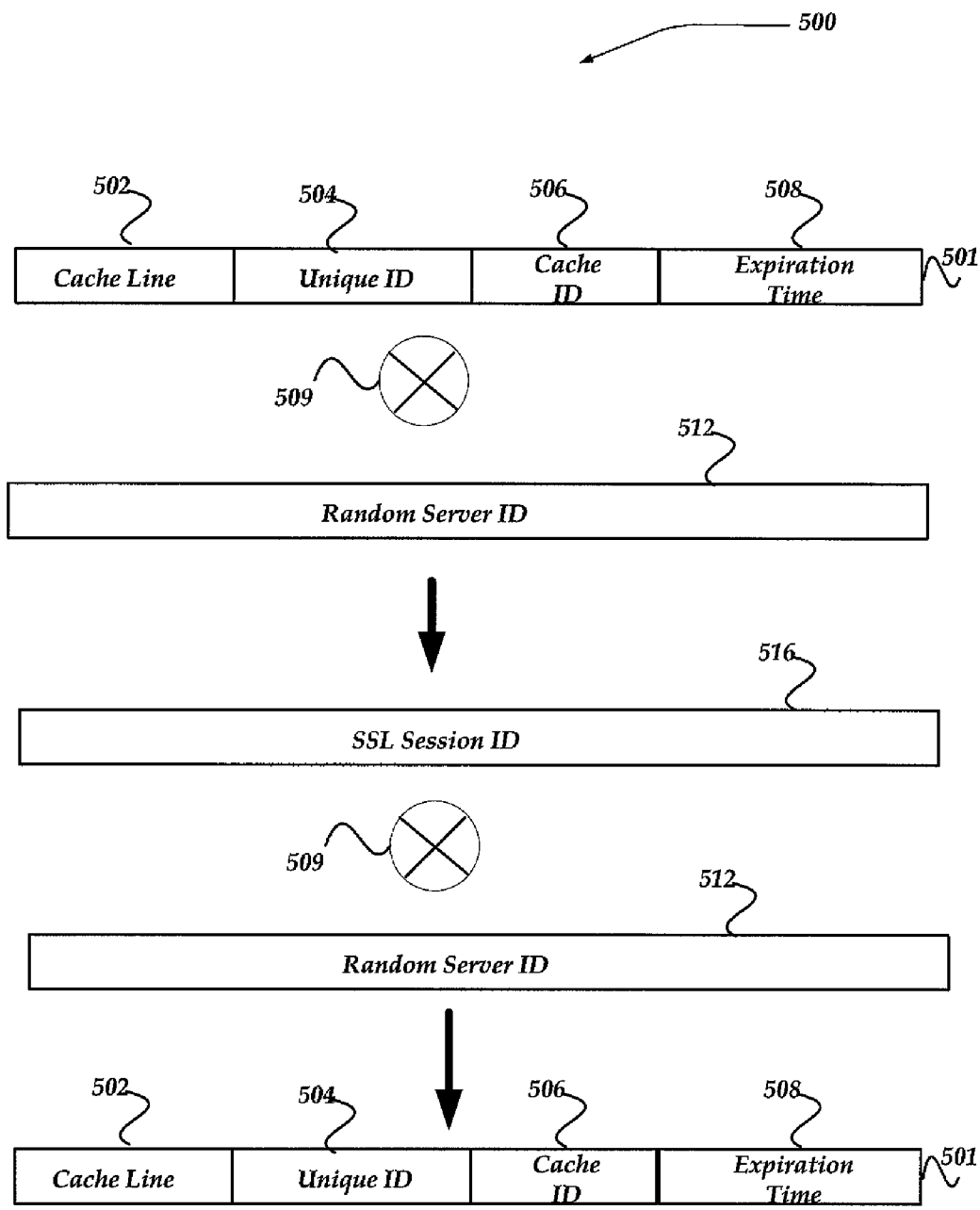
FIG. 5 illustrates a flow diagram generally showing one embodiment of a process for transcoding between an SSL session ID and a plurality of information about a session cache.

One embodiment of the operations of session cache 252, tuning manager 256, and/or SSL manager 258 is described in more detail in conjunction with FIGS. 3-5.

Generalized Operation

The operation of certain aspects of the invention will now be described with respect to FIGS. 3-5. Processes 300-500 of FIGS. 3-5 may be implemented, in one embodiment, within TMD 108 or server devices 109-110 of FIG. 1.

FIG. 3 illustrates a logical flow diagram generally showing one embodiment of a process for tuning a session cache for providing SSL session information. Process 300 of FIG. 3 begins, after a start block, at block 301, where a first SSL session ID is generated within a first SSL handshake protocol for establishing an SSL connection and SSL session. The first SSL session ID may be based on a combination of a generated ID and a pre-determined ID associated with a network device. In one embodiment, the generated ID and the pre-determined ID may be combined using an exclusive-or operation, or any other reversible operation.

In one embodiment, the pre-determined ID may be generated for a network device, such TMD 108 and/or server devices 109-110 of FIG. 1. In one embodiment, the pre-determined ID may be generated initially as a random value, and may be stored and reused across multiple SSL handshake protocols and/or SSL sessions for the TMD. In one embodiment, the pre-determined ID may be kept secret from users or devices outside the network device. However, the pre-determined ID is maintained for later use. Therefore, in one embodiment, the pre-determined ID may be stored securely. In one embodiment, another reversible operation besides exclusive-or may be used without departing from the scope of the invention, including, but not limited to using RC4, or the like.

In one embodiment, the generated ID may be generated based on an expiration time associated with the SSL session, a cache line index into a cache lookup table, a cache ID identifying the cache lookup table, and a unique ID, or the like. The first SSL session ID may be sent to a client device within, for example, a SERVER-HELLO message. A client device may receive and store the first SSL session ID for use in re-establishing the associated SSL session. The SSL connection for the SSL session may be then established.

At block 302, a second SSL session ID is received within a second SSL handshake protocol message. In one embodiment, receiving the second SSL session ID comprises receiving the second SSL session ID within a CLIENT-HELLO message. In one embodiment, the second SSL session ID may be the same as the first SSL session ID.

At block 304, the second SSL session ID is exclusive-or'ed or otherwise combined with a pre-determined ID to generate another ID.

At block 306, a failure statistic in re-establishing an SSL session is determined based on at least a portion of the other ID. Block 306 may be performed by process 400 of FIG. 4. Briefly, the other ID may be parsed into at least one or more portions. For example, the other ID may be a structure, and the first N bits may represent one portion, the next M bits may represent another portion, or the like. The portions may represent, among other things, an expiration time, a cache line, a cache ID, and/or a unique ID. The failure statistic may be determined based on whether the other ID is valid and whether information associated with the other ID is found in the session cache.

At decision block 308, it is determined whether the SSL session is valid based on the received second SSL session ID, session cache and/or the failure statistic. In one embodiment, if the failure statistic indicates an invalid SSL session ID, processing continues to block 312. Otherwise, processing continues to block 310.

In another embodiment, the presence of the other ID in the session cache may indicate that the SSL session is valid. If the other ID is found in the session cache, processing continues to block 310, and otherwise processing continues to block 312.

In another embodiment, an entry associated with the other ID in the session cache may be retrieved, parsed, or the like. The entry may include cryptographic information usable for re-establishing the SSL session. In one embodiment, a hash value may be stored in the entry. The hash value may be a hash of information associated with a previously created SSL session and/or a secret value. If the SSL session is to be re-established, an additional check against the stored hash may be performed. For example, another hash value may be generated based on the re-established SSL session and the secret value. If the new hash value matches the stored hash value, processing continues to block 310. Otherwise, processing continues to block 312.

At block 310, an SSL connection is established and the SSL session is re-established. In one embodiment, a shortened SSL/TLS handshake protocol may be used. A server may respond with a SERVER-HELLO message which includes the second SSL session ID. A client and the server may then exchange the CHANGE-CIPHER-SPEC messages and FINISHED messages. Processing then returns to a calling process for further processing.

At block 312, the session cache is tuned based on the failure statistic. The session cache is tuned not only for the client device attempting to re-establish the SSL session but also for other client devices/SSL sessions unrelated to this client device, thereby improving the efficiency of cache allocation and management. The failure statistic may be provided through a user interface. Tuning may comprise modifying an operation of the session cache. Tuning may comprise at least one of modifying a maximum cache size for the cache lookup table, an expiration time window for generating a new expiration time, a number of cache lookup tables, or the like.

In an alternate embodiment, at block 312, a new SSL session ID may be generated. The process for generating the new SSL session ID may be performed by, for example, block 301. The new SSL session ID may be provided to the client device. In one embodiment, a new SSL session associated with the new session ID may be established using the SSL handshake protocol. Processing then returns to a calling process for further processing.

FIG. 4 illustrates a logical flow diagram generally showing one embodiment of a process for providing failure statistics associated with providing SSL session information and/or an operation of the session cache. Process 400 of FIG. 4 begins, after a start block, at decision block 402, where it is determined whether a cache ID portion of the other ID is unassociated with a cache lookup table. In one embodiment, each cache lookup table in a session cache may be associated with a unique cache ID. If the cache ID portion does not match any of the unique cache IDs for any cache lookup table, processing continues to block 403, where an SSL session reuse failure is indicated in the failure statistic. The failure indication may be an indication that the requested SSL session is counterfeit. Processing then returns to a calling process for further processing. If, at decision block 402, the cache ID portion of the other ID is associated with a cache lookup table, processing proceeds to decision block 404.

At decision block 404, it is determined whether a cache line portion of the other ID is greater than a maximum cache line associated with the determined cache lookup table. The maximum cache line may be a parameter set or modifiable by an administrator user. If the cache line portion of the other ID is greater than the maximum cache line, processing continues to block 403, where an SSL session reuse failure is indicated in the failure statistic. The failure indication may be an indication that the requested SSL session is counterfeit. Processing then returns to a calling process for further processing. If, at decision block 404, the cache line portion of the other ID is less than or equal to the maximum cache line, processing proceeds to decision block 406.

At decision block 406, it is determined whether an expiration time portion of the other ID is less than or equal to a current time. In one embodiment, the current time may be the time of a network device acting as a server within the SSL handshake protocol. In one embodiment, the current time may be synchronized between a plurality of devices, for example, between a plurality of SSL load balancers. In one embodiment, the expiration time may be the time the SSL session ID/SSL session was created plus a time-to-live time. Accordingly, if the expiration time is less than or equal to the current time, the expiration time has passed, and the SSL session has expired. In an alternate embodiment, the creation time may be stored in the other ID, instead of the expiration time. The expiration time may be determined as the creation time plus the time-to-live. The determination of whether the SSL session has expired may be also determined.

In any case, if an expiration time portion of the other ID is less than or equal to a current time, processing proceeds to block 403, where an SSL session reuse failure is indicated in the failure statistic. In one embodiment, the failure indication may comprise an indication that the SSL session has expired. The failure indication may also comprise a histogram of a number of reuse attempts after expiration, a time elapsed between the expiration time and the current time, or the like. Accordingly, the failure indication may inform an administrator that the time-to-live should be increased if the rate or amount of reuse attempts is above a threshold. Processing then returns to a calling process for further processing. If, at decision block 406, an expiration time portion of the other ID is greater than a current time, processing proceeds to decision block 408.

At decision block 408, it is determined whether a unique ID portion of the other ID is greater than a maximum unique ID or is otherwise invalid. In one embodiment, the maximum unique ID may be incremented and used as a new unique ID for every new SSL session ID/SSL session created. If the unique ID portion is greater than the maximum unique ID, then that unique ID does not match any SSL session ID/SSL session and is therefore invalid.

In an alternate embodiment, the unique ID may be determined to be invalid by matching the other ID against information in a cache entry in a cache lookup table. The cache lookup table may be retrieved based on the cache ID portion. The cache entry may be retrieved from the cache lookup table based on the cache line portion. If a unique ID portion of the cache entry does not match the unique ID portion, the unique ID portion is determined to be invalid.

In any case, if the unique ID portion of the other ID is greater than the maximum unique ID or is otherwise invalid, processing continues to block 403, where an SSL session reuse failure is indicated in the failure statistic. The failure indication may be an indication that the size of a cache lookup table was too small and/or that the cache entry and the associated SSL session information was flushed (overwritten) from the cache lookup table. In one embodiment, the cache lookup table may act as a circular queue. As a new SSL session ID/SSL session is created, the oldest entry in the cache lookup table may be flushed and overwritten with the new SSL session information, including the new SSL session ID/new unique ID. Accordingly, the failure indication may inform an administrator that the size of the cache lookup table should be increased. Processing then returns to a calling process for further processing. If, at decision block 408, the unique ID portion of the other ID is less than or equal to the maximum unique ID and is otherwise valid, processing proceeds to block 410.

At block 410, an SSL session reuse success is indicated in the failure statistic. In one embodiment, a histogram of successfully re-establishing the SSL session may be indicated. In an alternate embodiment, block 410 may not be performed. Processing then returns to a calling process for further processing.

FIG. 5 illustrates a flow diagram generally showing one embodiment of a process for transcoding between an SSL session ID and a plurality of information about a session cache. As shown, process 500 shows a plurality of components and operations embodying a process for generating an SSL session ID for an SSL session based on the plurality of information and using the SSL session ID to re-establish the SSL session and to retrieve the plurality of information.

The process for generating the SSL session ID begins with generating ID 501. As shown, ID 501 is created using a plurality of information. ID 501 comprises cache line portion 502, unique ID portion 504, cache ID portion 506, and expiration time portion 508. ID 501 is combined with random server ID 512 using operation 509. Operation 509 may be any operation that is reversible. Operation 509 may be the exclusive-or operation. The combination of ID 501 and random server ID 512 generates SSL session ID 516. SSL session ID 516 may be used within the SSL handshake protocol. In one embodiment, a server may reply with SSL session ID 516 to identify the SSL session being created. In one embodiment, SSL session ID 516 may be included in a SERVER-HELLO message. SSL session ID 516 may be associated with an established SSL session. SSL session ID 516 may be used in a subsequent SSL handshake protocol to re-establish the SSL session.

The process for re-establishing the SSL session using the SSL session ID begins with a client device sending SSL session ID 516 within a CLIENT-HELLO message. SSL session ID 516 may be combined with random server ID 512 using operation 509 to generate the ID 501. In another embodiment, any other reversible operation may be used besides operation 509. If operation 509 successfully generates ID 501, the plurality of information may be extracted from ID 501. In one embodiment, cache line portion 502, unique ID portion 504, cache ID portion 506, and expiration time portion 508 may be extracted from ID 501. The plurality of information may be used to generate failure statistics associated with re-establishing the SSL session and/or to tune the session cache as described in conjunction with FIGS. 3-4.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Data Structure

Figure 6:
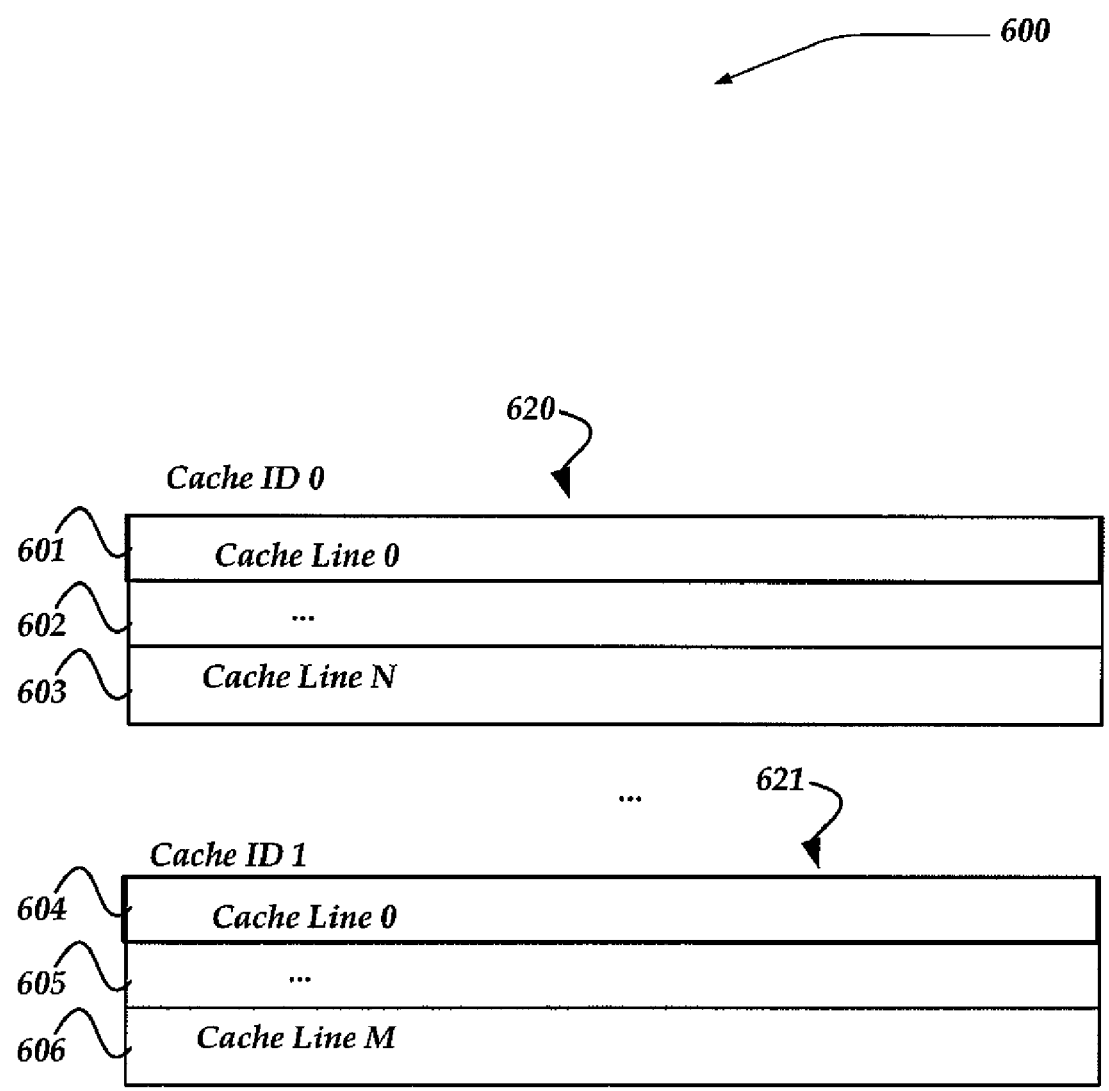
FIG. 6 shows one embodiment of a data structure for a session cache.

FIG. 6 shows one embodiment of a data structure for a session cache. While one data structure is shown, other data structures may be used without departing from the scope of the invention. As shown, the session cache may comprise a plurality of cache lookup tables 620-621.

Each cache lookup table may be identified by a unique cache ID. For example, cache lookup table 620 is identified by cache ID 0, and cache lookup table 621 is identified by cache ID 1. Each cache lookup table may include a plurality of entries 601-606 for storing session information. For example, each entry may include a ID such as ID 501 of FIG. 5 and/or cryptographic information usable for re-establishing an SSL session. Each entry may be identified by a unique cache line for the particular cache lookup table. For example, for cache lookup table 620, entry 601, the cache line is cache line 0. Cache line 0 is unique for cache lookup table 620. However, cache line 0 may be re-used in cache lookup table 620. For example, cache line 0 is used to identify entry 604. At least one of cache lookup tables 620-621 may be a circular queue. For example, for cache lookup table 621, new entry m+1 will be added to entry 604 for cache line 0 because m+1 exceeds the size of cache lookup table 621.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device for managing a network communication, comprising:
    an input interface for receiving requests and sending responses;
    a session cache for storing information for re-establishing an Secured Socket Layer (SSL) session, wherein the session cache comprises at least one cache lookup table; and
    a processor arranged to enable actions embodied by at least a portion of instructions stored in a memory, the actions comprising:
        receiving an SSL session identifier (ID) within an SSL handshake protocol for establishing with a client device, an SSL connection;
        performing a reversible exclusive-or operation on the SSL session ID and a pre-determined ID associated with the network device to generate an ID, wherein the generated ID comprises at least one of a cache line for identifying an entry within a cache lookup table, or a cache ID for identifying the cache lookup table;
        determining, based on at least a portion of the generated ID, a failure statistic associated with re-establishing an SSL session for the SSL connection; and
        tuning the session cache based on the failure statistic derived from the reversible exclusive-or operation performed on the SSL session ID.

2. The network device of claim 1, wherein determining the failure statistic is based at least in part on one of:
    whether the cache line is greater than a maximum cache size, or
    whether the cache ID is unassociated with one of the at least one cache lookup table.

3. The network device of claim 1, wherein determining the failure statistic is based at least in part on one of:
    whether an expiration time portion of the generated ID is less than a current time of the network device, or
    whether an unique ID portion of the generated ID is greater than a maximum unique ID.

4. The network device of claim 1, wherein tuning comprises:
    modifying a maximum cache size for the cache lookup table, an expiration time window for generating a new expiration time, or a number of cache lookup tables.

5. The network device of claim 1, wherein receiving an SSL session ID comprises receiving the SSL session ID within a CLIENT-HELLO message.

6. The network device of claim 1, wherein the actions further comprise:
    retrieving the information for re-establishing the SSL session from the session cache based on the generated ID.

7. The network device of claim 1, wherein the actions further comprise:
    establishing the SSL connection, if the SSL session ID is determined as valid based on the at least the portion of the generated ID.

8. A system for managing a network communication, comprising:
    a session cache for storing at least a plurality of Secured Socket Layer (SSL) session identifiers (IDs), wherein the session cache comprises at least one cache lookup table; and
    a network device interposed between a client and at least one server, wherein the network device is configured to perform actions comprising:
        receiving an SSL session ID within an SSL handshake protocol for establishing an SSL connection with the client, wherein data sent over the SSL connection is configured to be forwarded from the client to the at least one server;
        performing a reversible exclusive-or operation on the SSL session ID and a pre-determined ID associated with the network device to generate an ID, wherein the generated ID comprises a plurality of information associated with an operation of the session cache;
        determining, based on at least a portion of the generated ID, a failure statistic associated with re-establishing an SSL session for the SSL connection; and tuning the session cache based on the failure statistic derived from the reversible exclusive-or operation performed on the SSL session ID.

9. The system of claim 8, wherein the generated ID comprises a cache line for identifying an entry within the at least one cache lookup table, and wherein determining the failure statistic is based on whether the cache line is greater than a maximum cache size.

10. The system of claim 8, wherein the generated ID comprises an SSL session ID, and wherein determining the failure statistic is based on whether the SSL session ID is greater than a maximum unique ID.

11. The system of claim 8, wherein the generated ID comprises a cache ID, and wherein determining the failure statistic is based on whether the cache ID is unassociated with one of the at least one cache lookup table.

12. The system of claim 8, wherein the generated ID comprises a expiration time, and wherein determining the failure statistic is based on whether the expiration time is less than a current time.

13. The system of claim 8, wherein tuning comprises:
modifying a maximum cache size for at least one cache lookup table, an expiration time window for generating a new expiration time, or a number of at least one cache lookup table.

14. The system of claim 8, wherein the actions further comprise:
retrieving at least one of the plurality of SSL session IDs from the session cache based on the generated ID; and
establishing the SSL connection based on the at least one of the plurality of SSL session IDs.

15. A non-transitory machine-readable storage medium having machine-executable instructions stored thereon, which when executed by at least one processor, causes the at least one processor to perform one or more actions, comprising:
receiving an SSL session identifier (ID) within an Secured Socket Layer (SSL) handshake protocol message for establishing an SSL connection;
performing a reversible exclusive-or operation on the SSL session ID and a known value to generate an ID, wherein the generated ID comprises a plurality of information associated with an operation for caching the SSL session ID;
determining, based on at least a portion of the generated ID, a failure statistic associated with re-establishing an SSL session for the SSL connection; and
tuning the operation for caching based on the failure statistic derived from the reversible exclusive-or operation performed on the SSL session ID.

16. The non-transitory machine-readable storage medium of claim 15, wherein tuning comprises:
modifying a maximum cache size, an expiration time window for generating a new expiration time, or a number of cache lookup tables.

17. The non-transitory machine-readable storage medium of claim 15, wherein tuning comprises:
providing an interface for modifying the operation.

* * * * *